May 30, 1950 L. J. APPLEGATE 2,509,410
EARTH BORING MACHINE
Filed Aug. 29, 1946 2 Sheets-Sheet 1
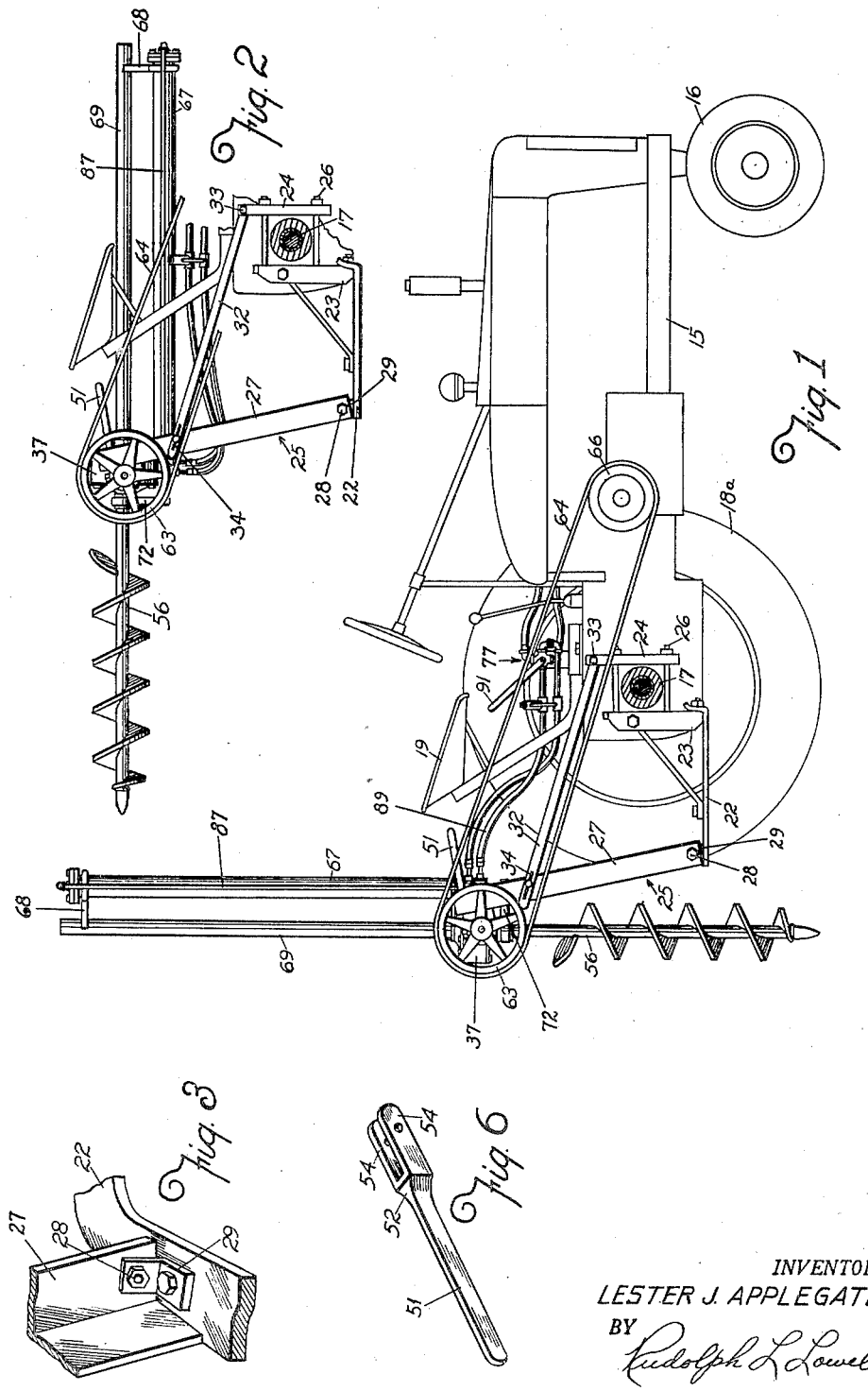
INVENTOR.
LESTER J. APPLEGATE
BY Rudolph L. Lowell
ATT'Y

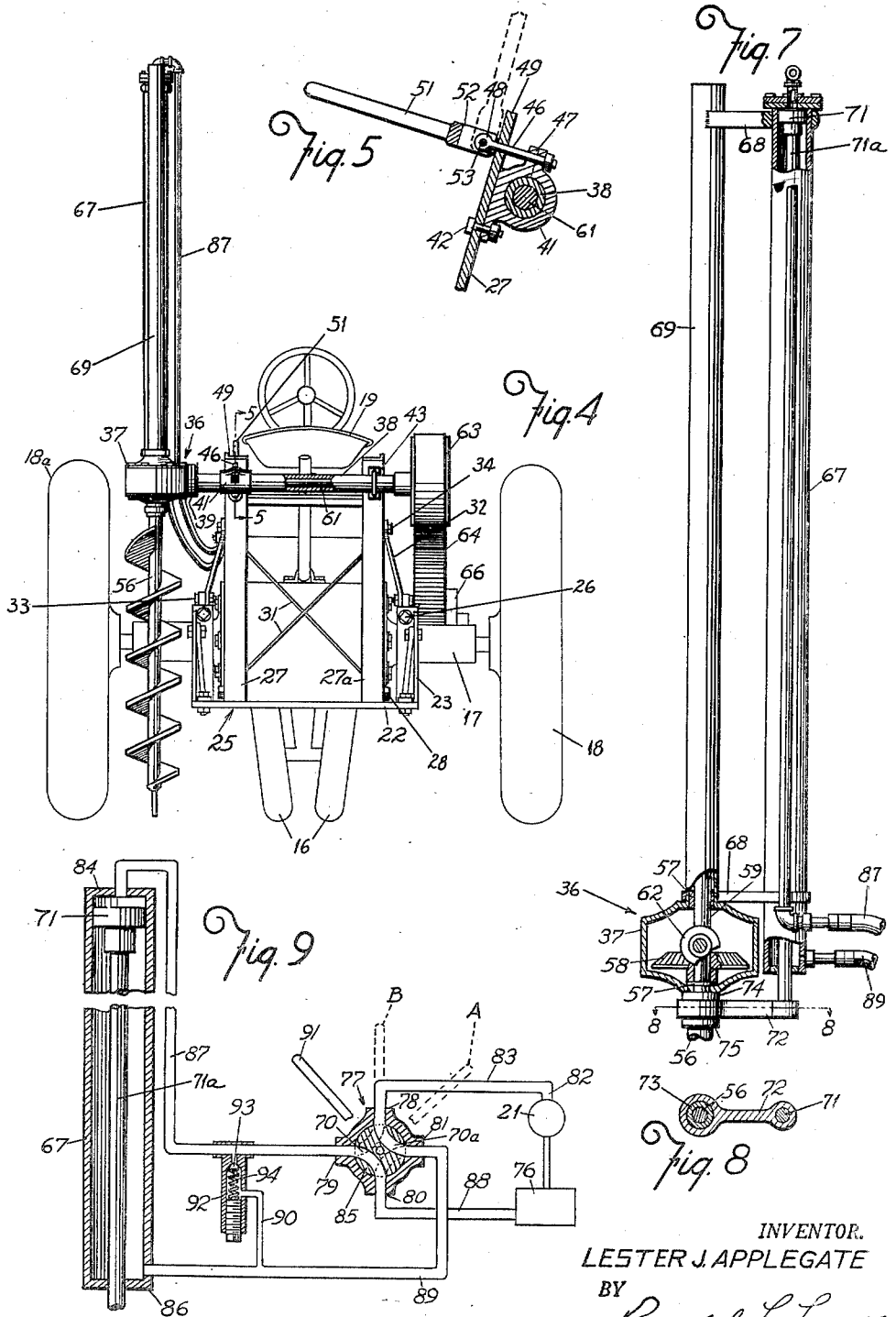

Patented May 30, 1950

2,509,410

UNITED STATES PATENT OFFICE 2,509,410

EARTH BORING MACHINE

Lester J. Applegate, Gilmore City, Iowa

Application August 29, 1946, Serial No. 693,631

3 Claims. (Cl. 255—19)

This invention relates generally to earth boring machines and in particular to a post hole digging attachment for a tractor.

An object of this invention is to provide an improved post hole digging machine.

A further object of this invention is to provide a post hole digging machine in which an auger is completely operable and adjustably movable to a desired digging angle by the tractor operator while he is in a seated position on the machine.

Another object of this invention is to provide a post hole digging attachment for a tractor in which the operation of the auger is completely visible from the operator's seat on the tractor, and manually movable by the tractor operator while in a seated position from an upright digging position to a horizontal carrying position to one side of the operator's seat.

A still further object of this invention is to provide a tractor post hole digging attachment which is compact and light in weight, capable of being assembled with and removed from the tractor by one man with a minimum of time and effort; adapted for easy and quick manipulation by the tractor operator while he is on the tractor, and capable of digging a series of holes in a short period of time.

A feature of this invention is found in the provision of a post hole digging attachment for a tractor in which an auger is supported for axial and rotational movement rearwardly of the tractor at a position to one side of the tractor operator's seat. The auger shaft is driven from a power take-off on the tractor and is axially moved by a hydraulic cylinder extended axially of and in a parallel relation with the auger shaft, with the hydraulic cylinder being in fluid connection with a pump unit on the tractor. A valve means for controlling the application of fluid under pressure to the cylinder, is located adjacent to the tractor operator's seat so that the auger is completely visible and operable by the tractor operator while he is in a seated position.

Another feature of this invention is found in the provision of a post hole digging attachment for a tractor in which a support means for an auger shaft is mounted on an upright frame, positioned rearwardly of the tractor operator's seat, for rotational movement about an axis extended transversely of the tractor. The auger is located to the inside of one of the rear traction wheels and journaled on the support means for rotational and axial movement. A locking means on the upright frame, arranged to one side of the operator's seat is adapted to releasably lock the auger shaft support means against rotation between rotated positions providing for an upright digging position of the auger shaft and a carrying or transport position in which the auger is extended longitudinally of the tractor across the tractor rear axle between the operator's seat and a rear traction wheel. Rotation of the auger shaft support means, on release of the locking means, is accomplished manually.

Still another feature of this invention is found in the provision of a post hole digging attachment for a tractor in which an auger, supported rearwardly of the tractor to one side of the operator's seat, is axially movable by a hydraulic cylinder carried on the auger shaft supporting means. The fluid system for the cylinder includes a pump and fluid reservoir unit on the tractor and a manually operated control valve located adjacent to the tractor operator's seat. In order to maintain the supply of the fluid to the cylinder at a pre-determined working pressure the fluid system is provided with an automatically operable valve member which connects the cylinder fluid supply line with the fluid reservoir when a pressure greater than such pre-determined working pressure is effected in the cylinder supply line.

Further objects, features and advantages of this invention will become apparent from the following description when taken in connection with accompanying drawings in which:

Fig. 1 is a side elevational view of a tractor showing the post hole digging attachment of this invention in assembly relation therewith, with parts of the tractor being removed and in section to more clearly show such assembly;

Fig. 2 is a side elevation of a fragmentary portion of the assembly in Fig. 1 with parts shown in changed positions;

Fig. 3 is a fragmentary detail perspective view;

Fig. 4 is a rear elevational view of the assembly shown in Fig. 1;

Fig. 5 is an enlarged sectional detail view taken on the line 5—5 in Fig. 4;

Fig. 6 is a perspective view of a lock lever;

Fig. 7 is an enlarged elevational view, with some parts broken away and in section, showing the assembly of the auger shaft with a hydraulic cylinder adapted to axially move the same;

Fig. 8 is a sectional detail view taken on the line 8—8 in Fig. 7; and

Fig. 9 diagrammatically illustrates a fluid system for auger shaft hydraulic cylinder shown in Fig. 7.

With reference to the drawings, the post hole digging attachment of this invention is illustrated in Figs. 1 and 4 in assembly relation with a tractor including a frame 15, front steering wheels 16, a rear axle 17 for supporting rear traction wheels 18 and 18a and a tractor operator's seat 19, disposed substantially between the rear traction wheels. An oil pump 21, including a fluid reservoir, is formed as part of the tractor for the purpose of supplying oil under pressure to attachments adapted for use with the tractor. A tractor draw bar 22 is supported rearwardly of the tractor on transversely spaced rear uprights 23 which are clamped against the rear side of the axle 17 through front upright clamp bars 24 and clamping bolts 26. The tractor thus far described is of a usual commercial type, known as the "Farmall."

The attachment of this invention includes a transverse upright frame, indicated generally as 25, and comprised of a pair of transversely spaced upright frame members 27 and 27a of an angle iron construction, and pivotally supported at their lower ends on bolts 28, carried in upright lugs 29 secured to the draw bar 22 (Figs. 1, 3 and 4). The frame members 27 and 27a are connected together by crossed brace bars 31. An adjustable pivoted movement of the upright frame 25, in a direction longitudinally of the tractor, is maintained by a pair of longitudinally extended adjustment rods 32, which are pivoted at their forward ends on bolts 33 carried in the top ends of the front upright clamp bars 24. The rear ends of the adjustable rods 32 are connected in a bolt and slot connection, as indicated at 34, with the upper ends of the frame members 27 and 27a.

A housing unit, designated generally as 36, is comprised of a gear casing member 37, and a tubular member 38 secured to one side of the gear casing through bolted flange members 39. The tubular member 38 is rotatably supported transversely of the tractor, at the upper end of the upright frame 25, by means including a split bearing member 41 (Figs. 4 and 5) mounted on the upright frame member 27 by a bolt 42, and a U-bearing 43 secured to the upright frame member 27a, with the tubular member 38 being of a length such that its opposite ends are extended laterally outwardly from the sides of the upright frame 25. The gear casing 37, secured to one end of the tubular member 38, is arranged rearwardly of the tractor at a position between the rear axle wheel 18a and the operator's seat 19, for a purpose which will appear later.

The tubular member 38 is locked against rotation on the upright frame 25 by the provision of a locking means including an eye bolt 46 (Figs. 4 and 5), having its shank loosely extended through the frame member 27 and the split section 47 of the bearing 41, such that its eye 48 is projected forwardly of the leg member 49 of the frame member 27. A locking lever 51 (Figs. 5 and 6) has a U-shaped member 52 integrally formed at one end and adapted to straddle the eye 48 of the bolt 46. A pin 53 is extended through the legs of the U-member 52 and through the eye 48 whereby to pivotally support the locking lever 51 on the pin 53.

The free ends 54 of the legs of the U-member 52 are of a rounded contour and adapted for riding engagement against the forward side of the leg 49 of the frame member 27. Thus, on rotation of the lever 51, to its dotted line position shown in Fig. 5, the bearing 41 is released from a clamping or frictional engagement with the tubular member 38 whereby the tubular member is freely rotatable within the bearings 41 and 43. On movement of the locking lever 51 to its full line position, also shown in Fig. 5, the bearing 41 is clamped into frictional engagement with the tubular member 38 to lock such member against rotation on the frame 25.

An auger shaft 56 (Figs. 4 and 7) is extended through the gear casing 37 in the plane of, but at right angles to the tubular member 38. Bearings 57, in the casing 37, journal the auger shaft 56 for rotational and axial movement. Mounted on the auger shaft 56, within the casing 37, is a bevel gear 58, which is in a key and slot connection 59 with the auger shaft. A transverse shaft 61 (Fig. 4), rotatably supported in the tubular member 38, has one end projected within the gear casing 37 for carrying a bevel gear 62, adapted for meshing engagement with the bevel gear 58. The opposite end of the transverse shaft 61 carries a pulley 63, which is connected through a belt 64 with a belt or power take-off 66 of the tractor. It is thus seen that the auger shaft 56 is operated from the tractor belt pulley 66 through the shaft 61 and the gears 58 and 62.

An axial movement of the auger shaft 56 is accomplished by means including a hydraulic cylinder 67 (Fig. 7) supported in a spaced parallel relation with the auger shaft 56 by strap members 68, secured by welding or other suitable means, to opposite ends of a tubular extension or guide 69 secured on the casing 37 and adapted to receive the upper portion of the auger shaft 56.

A piston 71, for the cylinder 67, carries a bearing arm 72 at its free end (Figs. 7 and 8). The auger shaft 56 is rotatably extended through a bearing member 73 mounted at the free end of the bearing arm 72 which member 73 is arranged between a pair of axially spaced collars 74 and 75, mounted on the auger shaft 56. The cylinder 67 is of a double acting type and on the admission of fluid therein to move the piston 71 downwardly, as viewed in Fig. 7, the bearing arm 72 engages the collar member 75 whereby the auger shaft 56 is moved downwardly in response to a downward movement of the piston 71. On an upward movement of the piston 71, the bearing arm 72 engages the collar member 74 to in turn provide for an upward movement of the auger shaft 56. It is seen, therefore, that the auger shaft 56 is moved upwardly and downwardly in direct response to an upward and downward movement of the piston 71.

The fluid system for the cylinder 67 (Fig. 9) includes the pump 21 and a fluid reservoir 76, generally formed as part of the pump 21, and a two-way valve unit, indicated generally as 77. The valve unit 77 includes four connections 78, 79, 80 and 81. The pump outlet 82 is connected with the valve connection 78 by a conduit 83, while the valve connections 79, 80 and 81 are connected respectively with the top 84 of the cylinder 67, the reservoir 76, and with the bottom 86 of the cylinder 67 through conduits 87, 88 and 89. A valve member 85 is provided with an actuation lever 91 and oppositely arranged fluid passages 70 and 70a.

In order to raise the piston 71, and in turn the auger shaft 56, the actuating lever 91 for the valve unit 77, is moved to its full line position, shown in Fig. 9, whereby fluid under pressure from the pump 21 passes through the conduit 83, fluid passage 70a, and through the conduit 89 to the lower end 86 of the cylinder 67.

Oil from the upper end of the cylinder 67 is returned to the reservoir 76 through conduit 87, fluid passage 70 and conduit 88. When the auger shaft 56 is to be lowered, the lever 91 is moved to its dotted line position A, also illustrated in Fig. 9, whereby oil under pressure from the pump 39 is supplied to upper end 84 of the cylinder 67 through the conduit 83, fluid passage 70, and conduit 87. Concurrently oil is discharged from the cylinder, through the conduit 89, oil passage 70a and conduit 88 to the reservoir 76. The valve member 85 interrupts the flow of oil between the pump 21 and the cylinder 67, on movement of the valve lever 91 to its dotted line position illustrated at B, whereby the oil passages 70 and 70a are in positions out of communication with the valve connections 78—81.

In the operation of the post hole digging attachment of this invention, the upright frame 25 is initially pivotally adjusted to provide for a desired tension in the driving belt 64 connected between the tractor pulley 66 and the driven pulley 63 on the transverse shaft 61. With the locking lever 51 in its position for releasing the tubular member 38, the tubular guide 69 and the cylinder 67 are manually gripped and manipulated to move the auger shaft 56 to a substantially upright or perpendicular position. Thus if the holes are to be drilled into a substantially flat or horizontal ground surface the auger shaft 56 will be moved to its position shown in Fig. 1. Where the holes are to be drilled in an inclined or sloped ground surface, so that the tractor wheels 16 and 18 and 18a are supported at different ground elevations, the auger shaft 56 would be inclined to one side or the other of its position illustrated in Fig. 1, to accommodate the inclination of the ground surface. On movement of the auger shaft to a substantially perpendicular position, regardless of the slope of the ground surface, the locking lever 51 is operated to lock the tubular member 38 against rotation within the bearings 41 and 43.

With the auger shaft 56 in its digging position, the control lever 91 of the valve unit 77 is actuated to initially provide for a downward movement of the auger shaft. When the hole has been dug to a desired depth the valve lever 91 is again operated to actuate the piston 71 to raise the auger shaft. As appears in Fig. 1, the valve control lever 91 is located adjacent to the tractor operator's seat 19 so as to be readily manipulated by the operator while he is in a seated position. Also, by virtue of the auger shaft 56 being arranged rearwardly of the tractor and in a position to one side of the operator's seat 19 (Figs. 1 and 4), the entire digging operation is completely visible to the tractor operator while in a seated position by his merely turning a little to one side and looking in a rearward and downward direction. Further, the locking lever 51, and the cylinder 67 and guide member 69, are all within easy reach of the tractor operator while he is in a seated position, so that adjustment of the auger shaft to a proper upright digging position can also be accomplished by the operator without requiring his dismounting from the tractor.

In some instances rocks or other hard materials are encountered by the auger during a digging operation. To prevent any damage to the auger or to the attachment when this condition occurs, the fluid system for the cylinder 67 is provided with a check valve 92 (Fig. 9) connected in a by pass line 90 between the conduits 87 and 89. The valve 92 includes a ball valve member 93 movable to an open position against a coil spring 94 in response to the fluid pressure within the conduit 87, to automatically by pass oil from the conduit 87 to the conduit 89, when the pressure of the oil in the conduit 87 exceeds a predetermined working pressure as determined by the pressure of the spring 94 acting to maintain the ball valve 93 in a valve closing position.

Thus on the striking of a rock, or the like, by the auger, the pressure of the fluid supplied to the cylinder 67 through the conduit 87 will increase only to the cylinder working pressure as determined by the pressure of the spring 94. When this pressure is exceeded and the valve 93 is opened, oil from the conduit 87 is by passed through the line 90 into the conduit 89 and thence through the fluid passage 70a and conduit 88 back to the reservoir 76.

In transporting or carrying the digging attachment over the highway or over a field to its place of work, the auger shaft 56, on release of the locking lever 51, is movable to a substantially horizontal position, illustrated in Fig. 2, and extended longitudinally of the tractor between the operator's seat 19 and the rear traction wheel 18a. The auger shaft 56 is thus extended across the top of the rear axle 17 so as to be completely free of any obstructions on the ground, and is entirely below the line of vision of the tractor operator so as not to impair his visibility in any way for steering and operating the tractor. Further, with the auger shaft in its raised or retracted position for transporting purposes, only the lower portion thereof is extended rearwardly from the tractor so that it offers only a minimum of interference with the usual turning space required for the tractor. It is apparent, of course, that the auger shaft 56 is positively maintained in its transport position on movement of the lever 51 to its locking position.

From a consideration of the above description, it is seen that the invention provides a post hole digging attachment for a tractor which is of a simple and compact construction, and comprised of a relatively few number of parts capable of being assembled on and removed from a tractor by one man in a relatively short period of time. Further, a digging operation is capable of being completely performed by the tractor operator while he is in a seated position since all of the controls for the entire digging operation are readily accessible and within an easy arm's reach from the operator's seat.

It is also to be noted that the rod 71a of the piston 71 is of a large diameter relative to the diameter of the cylinder 67, being on the order of 1¼" for the piston rod and 2" for the cylinder. As a result the upward travel of the auger shaft 56 takes place at a faster rate than its downward travel so as to shorten the time period required for a complete digging cycle.

Although the invention has been described with respect to a preferred embodiment thereof, it is to be understood that it is not to be so limited since changes and modifications can be made therein which are within the full intended scope of this invention, as defined by the appended claims.

I claim:

1. A post hole digging machine including a portable frame, an upright frame supported adjacent one end of said frame, a transverse shaft on said upright frame, first means for rotatably supporting said shaft, other means for rotatably supporting said shaft supporting means on said upright frame, means for releasably clamping said first means against rotational movement, an auger shaft adjacent one end of said transverse shaft, a housing for said auger shaft supported on said first means, means in said housing for connecting said two shafts, journal means in said housing supporting said auger shaft for rotational and axial movement, means for axially moving said auger shaft including a hydraulic cylinder mounted on said housing, a piston for said cylinder, means connecting said auger shaft with the free end of said piston, and means on said portable frame for rotating said transverse shaft and for supplying fluid under pressure to said cylinder.

2. A post hole digging attachment for a tractor having a rear axle with traction wheels thereon, a tractor operator's seat, and a transverse draw bar positioned rearwardly of said axle comprising, an upright frame mounted on said draw bar, a transverse tubular member on said upright frame at a position above the level of said axle, means rotatably supporting said tubular member on said upright frame, means for releasably locking said tubular member against rotation, a shaft rotatably extended through said tubular member, tractor operated means for driving said shaft, a housing member supported on one end of said tubular member to the inside of one of said traction wheels, an auger shaft supported in said housing for rotational and axial movement, means on said housing operable from said tractor for axially moving said auger shaft, and means within said housing for connecting said two shafts, with said housing and tubular members, on release of said locking means, being rotatable as a unit to provide for a movement of said auger shaft between an upright digging position and a substantially horizontal carrying position extended longitudinally of said tractor between said seat and traction wheel.

3. A post hole digging attachment for a tractor comprising a transversely extended housing unit rotatably supported at one end of said tractor, means for releasably locking said housing unit against rotation, a transverse shaft rotatably supported within said housing unit and adapted to be driven from a power take off on the tractor, an auger shaft supported at one end of said housing unit for rotational and axial movement, upright guide means on said housing unit for guidably supporting said auger shaft, means connecting said two shafts, means for axially moving said auger shaft including an upright hydraulic cylinder mounted at said one end of the housing unit in a parallel relation with said guide means, a piston for said cylinder movable from the lower end thereof, means fixed at the lower end of said piston and connected with said auger shaft to provide for an axial movement of the auger shaft in response to a movement of said piston, and tractor operated means for supplying fluid under pressure to said cylinder.

LESTER J. APPLEGATE.

REFERENCES CITED

The following references are of record in the file of this patent:

UNITED STATES PATENTS

| Number | Name | Date |
|---|---|---|
| 2,239,024 | Vance | Apr. 22, 1941 |
| 2,410,959 | Brown | Nov. 12, 1946 |
| 2,415,572 | Jacques | Feb. 11, 1947 |
| 2,416,036 | Zimmerlein et al. | Feb. 18, 1947 |

FOREIGN PATENTS

| Number | Country | Date |
|---|---|---|
| 285,418 | Great Britain | Aug. 23, 1928 |